Patented Mar. 2, 1943

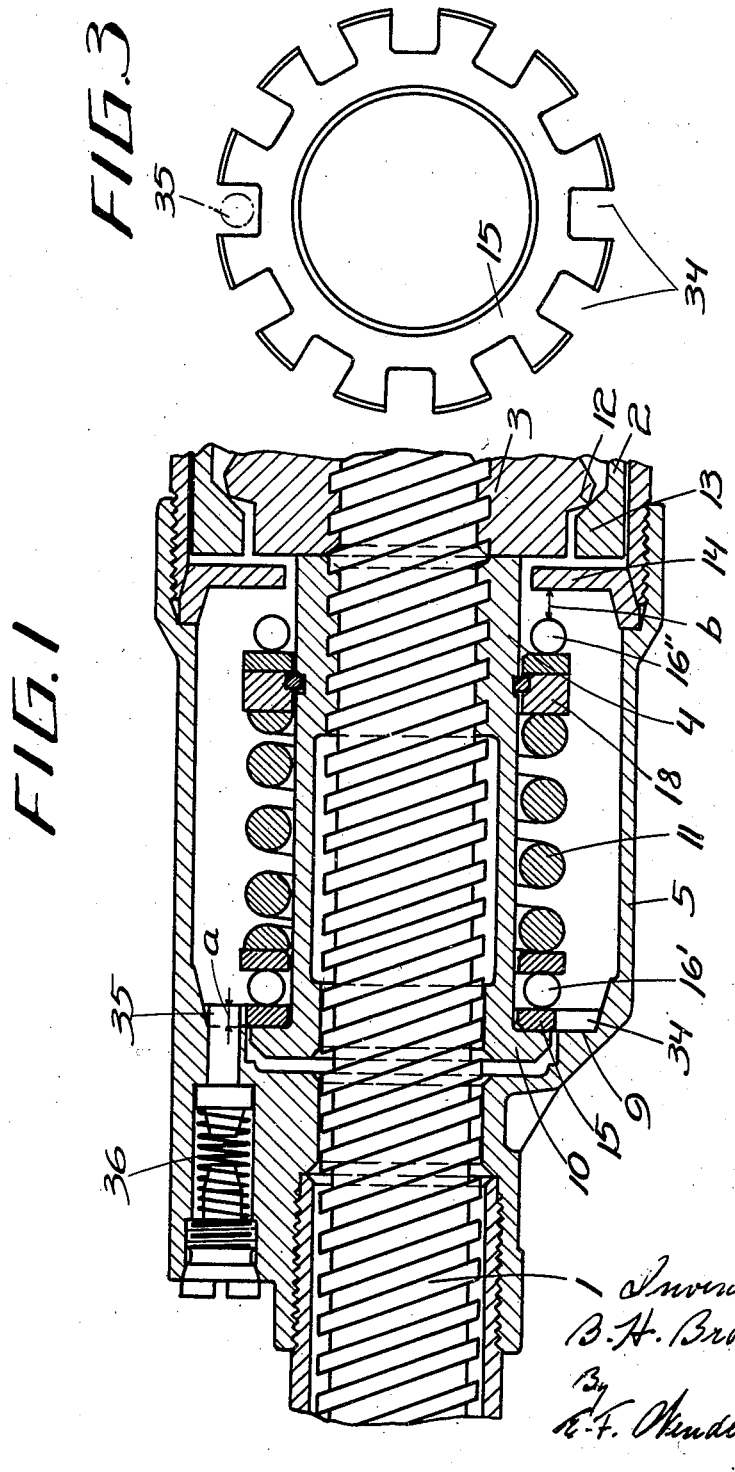

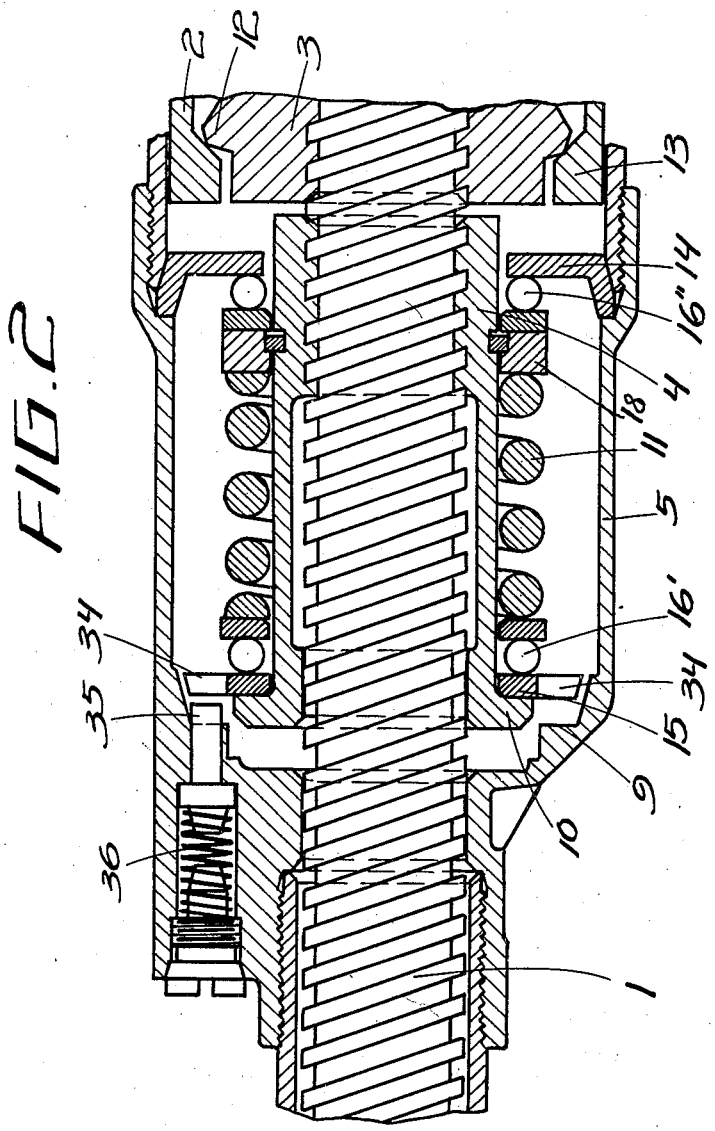

2,312,384

UNITED STATES PATENT OFFICE 2,312,384

AUTOMATIC SLACK ADJUSTER FOR BRAKES

Bert Henry Browall, Malmo, Sweden, assignor to Svenska Aktiebolaget Bromsregulatar, Malmo, Sweden, a corporation of Sweden Application February 16, 1942, Serial No. 431,173
In Sweden May 31, 1941

5 Claims. (Cl. 188—202)

This invention relates to automatic slack adjusters for brakes and, more particularly, to automatic slack adjusters of the kind disclosed in my U. S. Patent No. 2,225,001, the invention having for its object to improve this kind of slack adjusters.

A slack adjuster of the said kind comprises a two-part brake rod one part of which is in the form of a screw-spindle having screw-threads of such a pitch as to make the screw-spindle non-selflocking, an operating member movable axially on the other rod part, a first nut screwed on the screw-spindle for coupling it to said other rod part, and a second nut screwed on the screw-spindle for coupling it to the operating member. For identification said first nut hereinafter will be called the coupling nut, and said second nut will be called the adjusting nut.

As shown and described in my U. S. Patent No. 2,225,001 certain advantages are gained by providing between the adjusting nut and the operating member a slip friction clutch, preferably comprising an axially movable and rotatable spring-pressed abutment ring on the adjusting nut, which ring during the release movement of the brake abuts an abutment on the operating member and is held against rotation relatively thereto by friction. For additional certainty as regards this holding of the abutment ring against rotation it has also been proposed to connect the abutment ring with the operating member by a one-way clutch, for instance a one-way clutch spring as shown in Fig. 5 in my aforesaid U. S. Patent No. 2,225,001.

In slack adjusters of the kind having an axially movable operating member it has also been proposed to provide a special spring support between the operating member and its return spring, which spring support, in the position occupied by the parts at released brake, abuts an abutment for taking up the return spring pressure, so that the operating member is relieved from the return spring pressure in said position (compare my U. S. Patent No. 2,270,501). The intended advantages of this arrangement are those of ensuring an automatic locking of the slack adjuster when the brake is in the released position or in case the positive control of the locking mechanism in dependence on the brake piston stroke should fail to operate. But in addition to these advantages the arrangement also results in making the sleeve-shaped operating member easily rotatable about its axis at released brake, if the operating member only is detached from the rod or the like which serves the purpose of actuating it. In an automatic slack adjuster of the kind disclosed in my U. S. Patent No. 2,225,001 it would be possible to utilize the said result for the purpose of rotating the operating member for performing a manual slack adjusting movement (which would come in handy at renewal of worn-out brake shoes for instance), if it be taken as a postulate that the adjusting nut will partake in the rotation of the operating member in both directions. However, the known constructions of the adjusting nut and the abutment ring thereon do not meet with this postulate, for if the abutment ring coacts with the abutment on the operating member only by friction there will be no force for creating such friction at released brake, and in such cases in which it has been proposed to provide a clutch between the abutment ring and the operating member this clutch has been a one-way clutch operative in one direction only, and not in both directions, since the adjusting nut of course has to be easily movable in one direction of the screw-spindle.

The invention has for its object to provide for such a construction of the adjusting nut and the operating member, and especially of the abutment ring on the adjusting nut and of the abutment therefor on the operating member, that the abutment ring will be positively coupled to the operating member in both directions of rotation at released brake, but gets back its full freedom of movement in one direction at operation of the slack adjuster.

With this and other objects in view which will become apparent from the following detailed description in which reference is had to the accompanying drawings, I prefer to construct the abutment ring on the adjusting nut and the abutment therefor on the operating member so that they form the two parts of a dog clutch which is engaged when the abutment ring abuts the abutment on the operating member and which is adapted to be disengaged by an axial displacement of the operating member relatively to the adjusting nut at application of the brake. Further I provide for such an axial play or idle motion between the operating member and the adjusting nut that, at application of the brake, the said dog clutch will be disengaged before the operating member begins to move the adjusting nut on the screw-spindle.

Further characterizing features of the invention will appear from the detailed description of an embodiment of the invention illustrated on the accompanying drawings in which:

Fig. 1 is a fragmental axial section of the slack adjuster with the parts in normal position corresponding to released brake.

Fig. 2 is a fragmental section similar to Fig. 1 but with the parts in a position occupied by them during the beginning of the axial displacement of the adjusting nut on the screw-spindle at an application of the brake.

Fig. 3 is an end view of the abutment ring.

As regards the general construction and operation of an automatic slack adjuster of the kind to which the invention relates reference is made to my U. S. Patent No. 2,225,001, and also to my U. S. Patent No. 2,270,501.

The accompanying drawings illustrate the invention as applied to a form of slack adjuster much similar to the one of Fig. 1 in my U. S. Patent No. 2,225,001, and reference numerals like those used on the drawings of my said prior U. S. patent are used also on the accompany drawings for denoting corresponding parts wherever possible. Thus 1 denotes the screw-spindle; 2 the other rod part (which is tubular); 3 the coupling nut; 4 the adjusting nut; 5 the sleeve-shaped operating member (which is slidable axially on the tubular rod part 2 and adapted to be moved in relation thereto in opposite directions at application and release of the brake, respectively); 9 the abutment on the operating member 5; 10 the flange on the adjusting nut 4; 11 the compression spring mounted on the adjusting nut 4; 12 the abutment on the coupling nut 3; 13 the flange on the rod part 2 which forms the seat for coaction with the abutment 12; 14 the abutment flange on the operating member 5 which takes the adjusting nut 4 along in the axial displacement of the operating member 5 on the rod part 2 at application of the brake; 15 the abutment ring which is rotatable and axially movable on the adjusting nut 4 and is pressed by the spring 11 against the flange 10 and also coacts with the abutment 9 on the operating member 5; 16' the thrust ball bearing inserted between the abutment ring 15 and the adjacent end of the compression spring 11; and 16" the thrust ball bearing inserted between (the abutment flange 14 of) the operating member 5 and the collar 18 on the adjusting nut 4. All these elements correspond to those denoted by the same reference numerals in Fig. 1 of my U. S. Patent No. 2,225,001 and fulfil the same functions. According to the invention, however, the abutment ring 15 on the adjusting nut 4 and the coacting abutment 9 on the operating member 5 are constructed so as to form the two parts of a dog clutch which is engaged when the abutment ring 15 abuts the abutment 9 at released brake and which is adapted to be disengaged by an axial movement (over a distance marked *a* in Fig. 1) of the operating member 5 relatively to the adjusting nut 4. Further, according to the invention, there is provided for such an axial play or idle motion (over a distance marked *b* in Fig. 1) between the operating member 5 and the adjusting nut 4 that during the beginning of an application movement of the brake the said dog clutch will be disengaged before the operating member 5 begins to move the adjusting nut 4 on the screw-spindle 1. The dog clutch is shown in engaged position in Fig. 1 and in disengaged position in Fig. 2.

The term "dog clutch" is used herein to designate a clutch comprising two parts one of which is provided with one or more projections or dogs which fit into one or more recesses in the other part for positively preventing rotation between the parts in both directions when the clutch is engaged. In the embodiment of the invention illustrated on the drawings the recesses, denoted 34, are provided in the abutment ring 15 and, more particularly, in the outer part thereof which extends radially beyond the flange 10 on the adjusting nut 4 and coacts with the abutment 9, whereas the latter is provided with a projection or dog 35 which in released position of the brake fits into one of the recesses 34, as shown in Fig. 1. In the embodiment of the invention shown the said projection or dog 35 is in the form of a pin projecting axially from the abutment face 9. Preferably this pin is slidable axially and actuated by a spring 36 tending to hold the pin in the projecting position but permitting depression of the pin from this position. Thus, if one of the lugs between the recesses 34 of the abutment ring 15 should be opposite to the pin 35 when the abutment ring 15 is moved against the abutment 9 at release of the brake, the said lug will push the pin 35 to the left in Figs. 1 and 2 against the action of the spring 36, so that the pin does not prevent the abutment ring 15 from reaching its normal end position at released brake. But as soon as a rotation between the abutment ring 15 and the operating member 5 occurs, the pin 35 is moved by the spring 36 to the right into one of the recesses 34 and then positively prevents rotation between the abutment ring 15 and the operating member 5.

At a braking operation, when the operating member 5 is moved to the left (as viewed on the drawings) relatively to the rod part 2, the screw-spindle 1 is coupled to the rod part 2 by the coupling nut 3, rotation of the latter on the spindle being prevented by the abutment 12 engaging the seat formed by the flange 13. The adjusting nut 4, being held against rotation by the abutment ring 15 and its engagement with the dog or pin 35 on the abutment 9, also stands still relatively to the rod part 2 until the operating member 5 has been moved so far to the left as to disengage the dog or pin 35 from the abutment ring 15. Preferably the distance *b* is arranged between the ball bearing 16" and the coacting abutment flange 14 by which the operating member 5 moves the adjusting nut 4 to the left on the spindle 1 during the application movement of the brake.

In the position of the brake application movement in which the abutment flange 14 of the operating member 5 reaches the ball bearing 16" and begins to move the adjusting nut 4 to the left on the spindle 1, the adjusting nut 4 must be free to rotate on the spindle 1 under the action of the axial force exerted on the adjusting nut 4 by the abutment flange 14. For this reason the distance *b* is given a value which at released brake is somewhat greater than the value of the distance *a* by which the operating member 5 has to be moved axially to the left in relation to the adjusting nut 4 for disengaging the dog clutch between the operating member 5 and the abutment ring 15, so that the said dog clutch will have been disengaged before the abutment flange 14 reaches the ball bearing 16" during the brake application movement. Fig. 2 shows the parts in a position of the brake application movement in which the adjusting nut 4 has been moved a little to the left on the spindle 1 as indicated by the clearance between the right end of the adjusting nut 4 and the left end of the coupling nut 3.

For obtaining the chief object of the invention it is not necessary to construct the dog clutch between the operating member 5 and the abutment ring 15 in the manner shown on the drawings and described above by way of example. Any kind of dog clutch or any like clutch may be used which can be disengaged by axial movement of the two parts of the clutch in relation to each other and in which one of the clutch parts, or the dog or dogs of any one of the said parts, is or are arranged resiliently, or otherwise, in such a manner as not to prevent the clutch parts from being moved into their normal position in relation to each other at released brake in case a recess or recesses of one of the clutch parts should not be opposite to the dog or dogs of the other clutch part when the clutch parts are moved against each other in the direction for engaging the clutch at the release of the brake.

What I claim and desire to secure by Letters Patent is:

1. An automatic slack adjuster for brakes, comprising a two-part brake rod one part of which is movable axially in relation to the other part and comprises a screw-spindle having non-selflocking threads, an operating member movable axially on said other rod part and adapted to be moved in relation thereto in one direction at application and in the other direction at release of the brake, a coupling nut on said spindle for coupling it to said other rod part at application of the brake, an adjusting nut on said spindle for coupling it to said operating member at release of the brake, means providing a slip friction clutch between said adjusting nut and said operating member and including a spring-pressed abutment ring axially movable and rotatable with said adjusting nut, coacting elements on said operating member and said adjusting nut for moving the latter on said spindle at application of the brake, and means for positively coupling said abutment ring to said operating member in both directions of rotation when in normal position corresponding to released brake, said coupling means being adapted to be disengaged by an axial movement of said operating member relatively to said adjusting nut at application of the brake, and said coacting elements on said operating member and said adjusting nut being arranged to provide for such an axial play between said operating member and said adjusting nut that, at application of the brake, said coupling means will be disengaged before said operating member begins to move said adjusting nut.

2. An automatic slack adjuster for brakes, comprising a two-part brake rod one part of which is movable axially in relation to the other rod part and comprises a screw-spindle having non-selflocking threads, an operating member movable axially on said other rod part and adapted to be moved in relation thereto in one direction at application and in the other direction at release of the brake, a coupling nut on said spindle for coupling it to said other rod part at application of the brake, an adjusting nut on said spindle for coupling it to said operating member at release of the brake, means providing a slip friction clutch between said adjusting nut and said operating member and including a spring-pressed abutment ring axially movable and rotatable with said adjusting nut, coacting elements on said operating member and said adjusting nut for moving the latter on said spindle at application of the brake, and means on said operating member and said abutment ring for forming between them a dog clutch which is engaged when said operating member is in normal position corresponding to released brake and which can be disengaged by an axial movement of said operating member relatively to said adjusting nut at application of the brake, said coacting elements on said operating member and said adjusting nut being arranged to provide for such an axial play between said operating member and said adjusting nut that, at application of the brake, said dog clutch between said abutment ring and said operating member will be disengaged before said operating member begins to move said adjusting nut.

3. An automatic slack adjuster as claimed in claim 2, in which said means forming the dog clutch comprise a recessed outer portion of said abutment ring, and a dog projecting from an abutment face provided on said operating member for coaction with the recessed outer portion of said abutment ring.

4. An automatic slack adjuster as claimed in claim 2, in which said means forming the dog clutch between said abutment ring and said operating member comprises a projecting dog on one of said ring and member for coaction with any one of a number of recesses in the other of said ring and member, and in which said dog is resiliently held in its projecting position and can be depressed from this position.

5. An automatic slack adjuster for brakes, comprising a two-part brake rod one part of which is movable axially in relation to the other part and comprises a screw-spindle having non-selflocking threads, an operating member movable axially on said other rod part and adapted to be moved in relation thereto in one direction at application and in the other direction at release of the brake, a coupling nut on said spindle for coupling it to said other rod part at application of the brake, an adjusting nut on said spindle for coupling it to said operating member at release of the brake, coacting elements on said operating member and said adjusting nut for moving the latter on said spindle at application of the brake, and means for positively coupling said adjusting nut to said operating member in both directions of rotation when in normal position corresponding to released brake, said coupling means being adapted to be disengaged by an axial movement of said operating member in relation to said adjusting nut at application of the brake, and said coacting elements on said operating member and said adjusting nut being arranged to provide for such an axial play between said operating member and said adjusting nut that, at application of the brake, said coupling means will be disengaged before said operating member begins to move said adjusting nut.

BERT HENRY BROWALL.